US005877998A

United States Patent [19]
Aidala et al.

[11] Patent Number: 5,877,998
[45] Date of Patent: Mar. 2, 1999

[54] RECURSIVE METHOD FOR TARGET MOTION ANALYSIS

[75] Inventors: Vincent J. Aidala, Exeter; Marcus L. Graham, North Kingstown, both of R.I.

[73] Assignee: The United States Of America as represented by the Secretary of the Navy, Washington, D.C.

[21] Appl. No.: 759,357

[22] Filed: Nov. 18, 1996

[51] Int. Cl.[6] .................... G01S 15/66

[52] U.S. Cl. .................... 367/124

[58] Field of Search .................... 367/118, 124, 367/554

[56] References Cited

U.S. PATENT DOCUMENTS

| | | | |
|---|---|---|---|
| 4,327,500 | 5/1982 | Dickey et al. | 33/457 |
| 5,216,815 | 6/1993 | Bessacini | 33/228 |
| 5,317,543 | 5/1994 | Grosch | 367/125 |
| 5,432,753 | 7/1995 | Maranda | 367/124 |
| 5,471,433 | 11/1995 | Hammell et al. | 367/118 |
| 5,471,434 | 11/1995 | Davis et al. | 367/124 |
| 5,559,755 | 9/1996 | Beam | 367/118 |

*Primary Examiner*—Ian J. Lobo
*Attorney, Agent, or Firm*—Michael J. McGowan; Prithvi C. Lall; Michael F. Oglo

[57] ABSTRACT

The present invention relates to a method for estimating the motion of a target relative to an observer station and a system for performing the method. The method includes the steps of: generating data representative of the motion of the target relative to the observer station during first, second, and subsequent measurement legs; processing the data to yield smoothed estimate of the bearing, bearing rate, and bearing acceleration of the target during each measurement leg; and processing the smoothed estimates of the bearing, bearing rate, and bearing acceleration of the target to provide an estimate of the position of the target relative to the observer station and the velocity of the target. The system for performing the method includes a data preprocessing subsystem for generating the smoothed estimate of the bearing rate, bearing and bearing acceleration, a passive localization and target motion analysis subsystem, and a trajectory modelling subsystem having a first module for creating a model of the observer station motion and a second module for creating a model of the motion of the target.

9 Claims, 3 Drawing Sheets

RECURSIVE METHOD FOR TARGET MOTION ANALYSIS

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The present invention relates to a method for estimating the motion of a target relative to another object such as a marine vessel and to a system for performing the method.

(2) Description of the Prior Art

A variety of techniques and methods for target motion analysis (TMA) and tracking are known in the art. The purpose of many of techniques and methods is to arrive at an estimation of the bearing and range, as well as the course and the speed, of the target being tracked. One of the principal goals associated with these techniques and methods is to provide accurate and timely estimates of the target's motion.

U.S. Pat. No. 5,216,815 to Bessacini illustrates a method for determining range from a moving vessel to an approaching object using only two bearing measurements. In this method, a first bearing measurement to the approaching object is obtained at a first point in time using the vessel's conventional bearing sensor. The vessel and the approaching object are then postulated to be on an intercept course based on the first vessel's velocity vector and first bearing measurement. At a second point in time, the vessel commences a maneuver to a known second velocity vector different from the first velocity vector. Then, at a third point in time, a second bearing measurement to the approaching object is obtained using the vessel's bearing sensor. At the same third point in time, a virtual bearing to the approaching object is provided as if the vessel and the approaching object were on the postulated intercept course. A time difference is computed between the second and third points in time and standard trigonometric methods are applied to determine the range to the approaching object.

U.S. Pat. No. 5,317,543 to Grosch illustrates a method and a sensor for determining the distance of sound generating targets from acoustic signals which are subjected to a Fourier transformation. In order to determine the target distance, it is postulated that the acoustic signals received by an acoustic sensor at two successive points in time are from a target at distances $r_1$ and $r_2$, respectively, from the acoustic sensor. After the Fourier transformation, an evaluation of the phase difference in the sound spectrum yields the difference between the distances of the target from the sensor at the two points in time, from which difference the target distance is then calculated according to a spherical wave model.

U.S. Pat. No. 5,471,433 to Hammel et al. illustrates a trajectory estimation system for estimating a trajectory of a target in response to a series of data items which are generated in response to the motion of the target. The trajectory estimation system includes a data segmentation means and a trajectory selection means. The data segmentation means process the series of data items in accordance with a regression/multiple hypothesis methodology to generate a plurality of segments, each having associated data items which have similar features. The trajectory selection means for processing the segments in accordance with a multiple-model hypothesis methodology to generate a corresponding statistically supportable candidate trajectory motion estimate of target motion thereby to provide indicia of an overall trajectory of the target.

U.S. Pat. No. 5,471,434 to Davis et al. illustrates a system for facilitating the tracking of a target vehicle in connection with successively received acoustic sensor signal data items. A fast Fourier transform operation is performed in connection with each successive acoustic sensor signal data item to generate a phase and amplitude beam map reflecting spectral signal energy in the received acoustic sensor signal data item. If the beam map for an acoustic sensor signal data item indicates that the item represents a signal having a signal-to-noise ratio above a first predetermined threshold value, a beam map generated for a previous acoustic sensor signal data item is used to generate a bounded beam map, a determination is made as to whether the bounded beam map represents a signal having a second predetermined signal-to-noise ratio. In response to a positive determination for the latter signal-to-noise determination, both the beam maps are used to generate tracking information for the target vehicle.

U.S. Pat. No. 5,432,753 to Maranda illustrates a system for target detection and localization with an algorithm for performing TMA using data from a passive sonar array and which works directly with beam spectra to estimate the target track. The system determines when the coordinate trajectory of a hypothesized target aligns with the coordinate trajectory of an actual target and operates by forming long-term integrated spectral values from short-term values of frequency and angle coordinate values. The hypothesized target track that yields the maximum long-term integrated spectral value is used as the estimate of the true target track. A track generator is used to generate hypothesized target tracks for a search grid in the form of vectors that are clocked downward in a chain of latches. The latches are connected through computational elements, which are supplied with non-acoustic data, and RAMs to a summation pipeline, the RAMs being supplied with data from an array's sonar processor. The computational elements compute and provide angle and frequency addresses to the RAMs, whose outputs are applied to adders in the summation pipeline. Each RAM holds data for a single two-dimensional FRAZ spectrum. The summation pipeline supplies a completed sum of short-term spectral values at its output to provide the required long-term integrated spectral values.

Yet another method for determining range is known as Ekelund ranging. This is a widely used method of target localization. One of the deficiencies of present Ekelund methods is that they fail to fully exploit all available target data and provide only single epoch range estimates with no mechanism for refinement.

Under actual operating conditions, the measurement process for Ekelund ranging computations consists of discrete time series of target bearings corrupted by errors and taken while the observer vessel travels along a trajectory comprised of constant-velocity segments ("legs") interspersed with maneuvers. Here, a maneuver is defined as a non-zero change in the course and/or speed of the observer platform. At least two measurement legs of data are required for the estimation process to become observable (feasible). The measurement time series is subdivided into distinct sequences, each corresponding to a particular leg of the observer vessel. These sequences are then processed to provide smoothed estimates of target bearing, bearing rate, and bearing acceleration, which are time indexed to the midpoint of the appropriate leg. Finally, this data is made available for TMA computations.

Current Ekelund ranging procedures are designed to use only two measurement legs for range estimation and totally neglect bearing acceleration data. As additional measurement legs become available, a drop-add scheme is employed so that only the two most recent legs are utilized in the computation of new time updated estimates. The existing procedures do not allow for estimate refinement via utilization of data from discarded measurement legs and/or bearing acceleration, even though both sources usually contain valuable information about the new target range. In essence, the concept of reducing estimation error by expansion of the data measurement set is not exploited. The foregoing deficiencies typically degrade the performance of conventional Ekelund ranging procedures and results in sub-optimal estimation.

SUMMARY OF THE INVENTION

Accordingly, it is an object of the present invention to provide an improved method for performing target motion analysis.

It is another object of the present invention to provide an improved method as above for providing range estimates as soon as two measurement legs of data become available.

It is still another object of the present invention to provide a method as above having a significant reduction in estimation error.

It is still yet another object of the present invention to provide a method as above which is robust, relatively simple to implement, and recursive in nature.

Yet another object of the present invention is to provide a system for performing the method of the present invention.

The foregoing objects, as well as others, are attained by the method and the system of the present invention.

In accordance with the present invention, a method for providing an estimate of the motion of a target relative to an observer station broadly comprises the steps of: generating data representative of the motion of the target relative to the observer station during first and second measurement legs; processing the data to yield a smoothed estimate of the bearing, bearing rate and bearing acceleration of the target during each measurement leg; processing the smoothed estimate of the bearing, bearing rate and bearing acceleration of the target to provide a solution as to the position of the target relative to the observer station and the velocity of the target.

The system of the present invention broadly comprises means for generating data representative of the motion of the target relative to the observer station during first and second measurement legs; means for processing said data to yield a smoothed estimate of the bearing, bearing rate and bearing acceleration of the target during each measurement leg; and means for processing the smoothed estimate of the bearing, bearing rate and bearing acceleration of the target to provide an estimate of the position of the target relative to the observer station and the velocity of the target.

Other details of the method and system of the present invention as well as the other objects and advantages attendant thereto are set forth in the following description and drawings wherein like reference numerals depict like elements.

DESCRIPTION OF THE PREFERRED EMBODIMENT(S)

Figure 1:
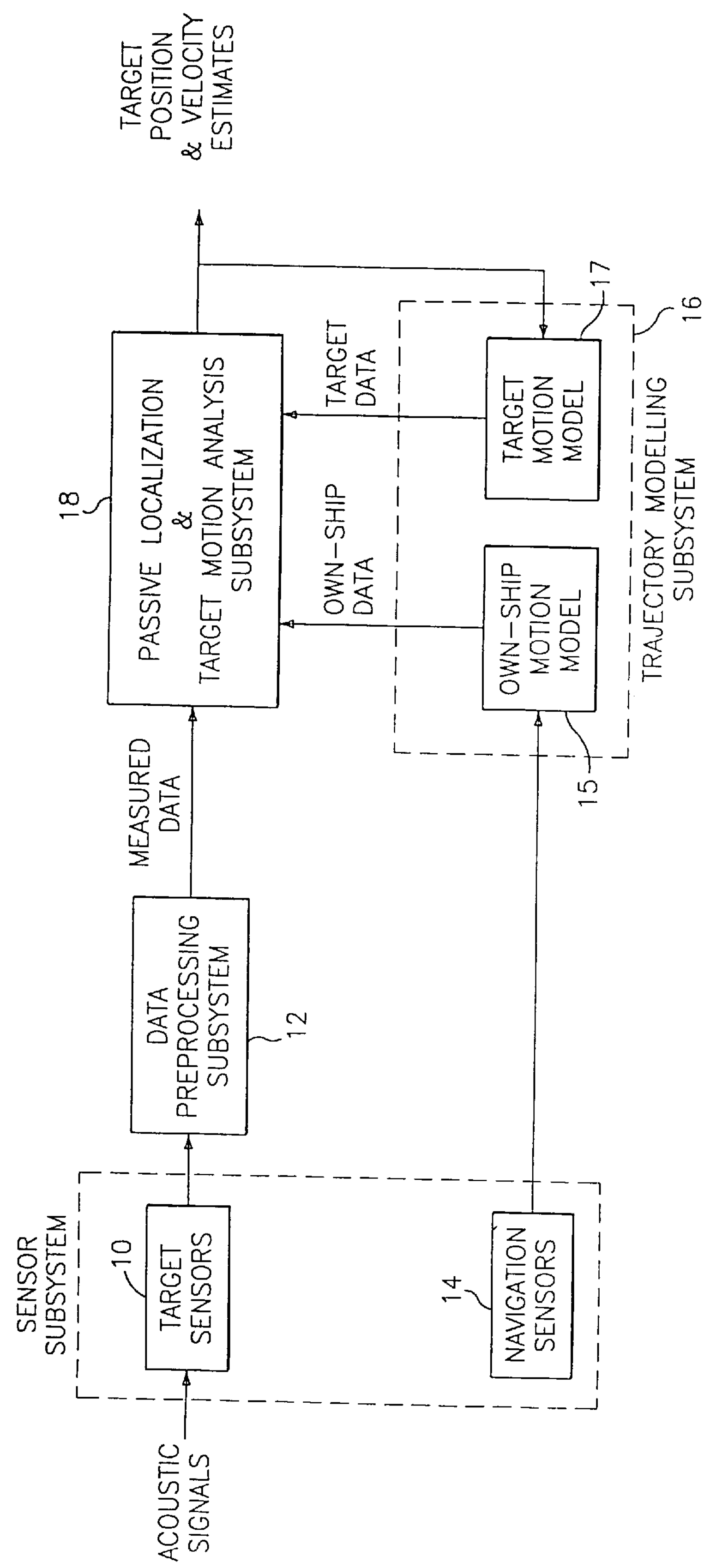
FIG. 1 is a schematic representation of a passive target motion analysis and tracking system in accordance with the present invention.

The method of the present invention deals with the problem of passive TMA tracking, namely estimating the range, bearing, course, and speed of a target traveling with constant velocity from a discrete-time series of corrupted bearing measurements. FIG. 1 provides a schematic representation of a system for implementing the method of the present invention.

Corrupted bearings are typically derived from target sensors 10 such as sonar devices on board the observer station or own ship, typically a maneuverable marine vessel. The sensor(s) 10 measure acoustic signals or noise emanating from the target. These signals are processed in a data preprocessing system 12 to yield smoothed and time indexed estimates of target bearing, bearing rate and bearing acceleration. The data preprocessing system may comprise any suitable device known in the art for yielding smoothed and time indexed estimates of target bearing, bearing rate and bearing acceleration from the acoustic data generated by the sensor(s) 10. Preferably, the data preprocessing system comprises a preprogrammed computation device having any suitable architecture.

Navigation sensors 14 on board the observer station simultaneously provide data measurements to a trajectory modeling subsystem 16. The navigation sensors 14 provide information about the observer station which allows for accurate computation of the observer station position and velocity at all instants of time.

As shown in FIG. 1, the system for implementing the method of the present invention has a trajectory modeling subsystem 16. The trajectory modeling subsystem 16 contains two modules. The first is a module 15 for creating a motion model of the observer station using data from the navigation sensors 14. The second is a module 17 for generating a target motion model. Each of these modules may comprise any suitable means known in the art for generating the desired models. Preferably, they comprise a preprogrammed computational devices for generating the models. The devices may use any desired programming known in the art to generate the models. The programming which is used by the modules does not form part of the present invention.

As further shown in FIG. 1, the system used to implement the method of the present invention includes a passive localization and target motion analysis subsystem 18. As shown in FIG. 1, the subsystem 18 receives the smoothed and time indexed estimates of target bearing, bearing rate and bearing acceleration from the data preprocessing system 12 as a first input. The subsystem 18 also receives inputs from the observer station motion model module 15 and the target motion model module 17. The subsystem 18 outputs target position and velocity estimates which are fed to the target motion model module 17 and to a display device (not shown).

Figure 2:
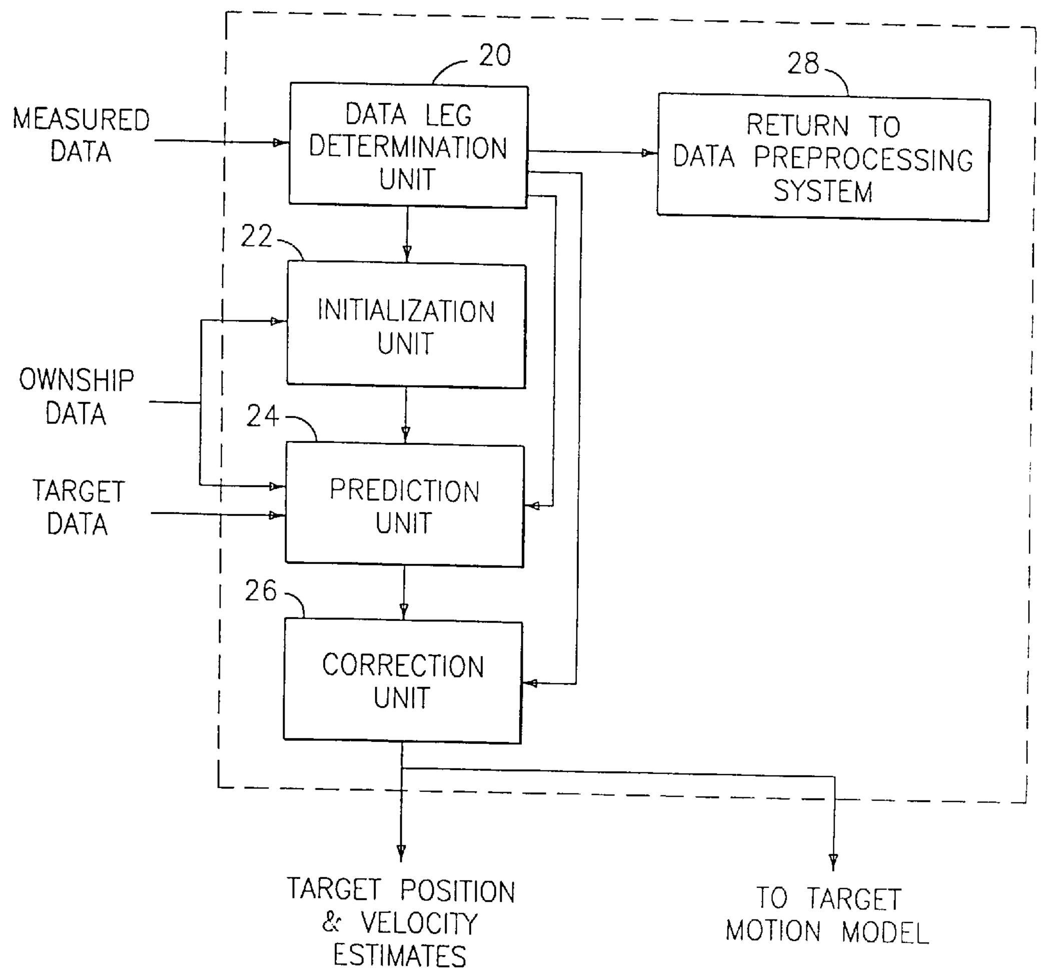
FIG. 2 is a block diagram illustrating the passive localization and target motion analysis subsystem.

The architecture for the passive localization and target motion analysis subsystem 18 is shown in FIG. 2. As shown therein, the subsystem 18 includes a data leg determination unit 20 which receives the smoothed and time indexed data from the data preprocessing system 12. The subsystem 18 further includes an initialization unit 22, a prediction unit 24, a correction unit 26 and a data preprocessing system return module 28. Each of the units 20, 22, 24, and 26 as well as the return module 28 may comprise any suitable computation device known in the art programmed to carry out a set of calculations in accordance with the flowchart shown in FIG. 3 and described hereinafter.

As shown in FIG. 2, both the initialization unit 22 and the prediction unit 24 receive data about the observer station from the observer station motion model module 15 in the trajectory modeling subsystem 16. Additionally, the prediction unit 24 receives target data from the target motion model module 17 in the trajectory modeling subsystem 16.

To assist in understanding the processing of information by the passive localization and target motion analysis subsystem 18, the following parameter definitions and ancillary information are provided:

i=measurement leg number, i=1, 2, 3, . . .

$t_i$=time at midpoint of leg i $\Delta T_i$=total length of time data measurements taken on leg i $\beta_i$=smoothed bearing at time $t_i$ $\dot{\beta}_i$=smoothed bearing rate at time $t_i$ $\beta_i$=smoothed bearing acceleration at time $t_i$ $\dot{\theta}_i=\dot{\beta}_i(\Delta T_i)$ $\theta_i=\frac{1}{2}\beta_i(\Delta T_i)^2$ $$\underline{VT}=\begin{bmatrix} VT_x \\ VT_y \end{bmatrix}=\begin{bmatrix} x \text{ component of target velocity (constant)} \\ y \text{ component of target velocity (constant)} \end{bmatrix}$$

$$\underline{VO_i}=\begin{bmatrix} VO_{xi} \\ VO_{yi} \end{bmatrix}=\begin{bmatrix} x \text{ component of own ship velocity at time } t_i \\ y \text{ component of own ship velocity at time } t_i \end{bmatrix}$$

$$\underline{XO_i}=\begin{bmatrix} XO_{xi} \\ XO_{yi} \end{bmatrix}=\begin{bmatrix} x \text{ component of own ship position at time } t_i \\ y \text{ component of own ship position at time } t_i \end{bmatrix}$$

$$\underline{X_i}=\begin{bmatrix} R_i \\ \underline{VT} \end{bmatrix}=\begin{bmatrix} \text{Range own ship to target } t_i \\ \text{Target velocity (assumed constant)} \end{bmatrix}$$

$$P_i=\begin{bmatrix} P11_i & P12_i & P13_i \\ P21_i & P22_i & P23_i \\ P31_i & P32_i & P33_i \end{bmatrix}=e \text{ covariance matrix assiciated with } \underline{X_i}$$

$(\tilde{\underline{X}}_i, \tilde{P}_i)$ and $(\hat{\underline{X}}_i, \hat{P}_i)$ are predicted and corrected estimates of $(\underline{X}_i, P_i)$, respectively.

Figure 3:
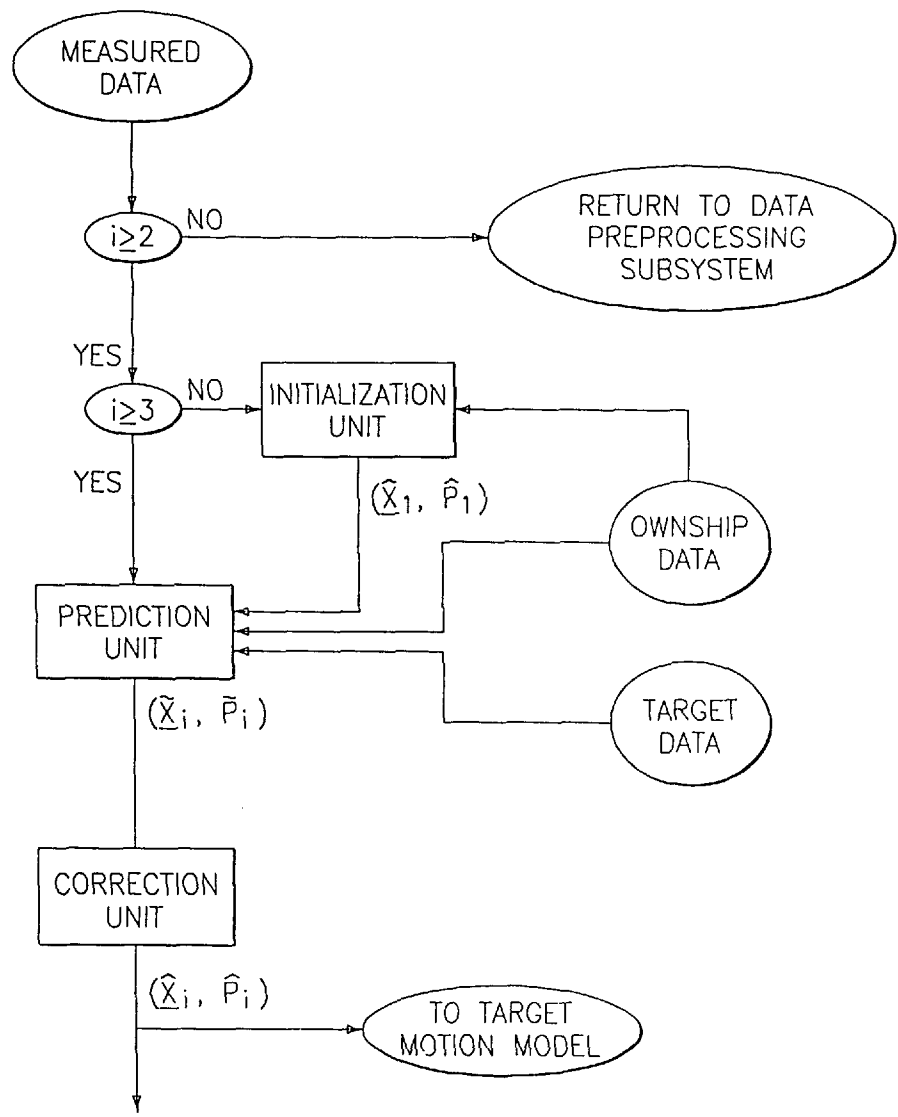
FIG. 3 is a flowchart of the passive localization and target motion analysis subsystem.

FIG. 3 is a flowchart showing the flow of data through the subsystem 18. The measured data from the data preprocessing system is fed to the data leg determination unit which associates the data with a particular measured leg. If the measured leg is the first measurement leg, then the subsystem goes to the return module 28 to await data from a second measurement leg. After receiving measured data from two different measurement legs, the data is fed to the initialization unit 22 which computes an initial estimate of the range from the observer station to the target for at time $t_1$ (assuming the target velocity to be constant) and an error covariance matrix. The initial estimate and the error covariance matrix are computed as follows:

$$\hat{\underline{X}}_1=H^{-1}\underline{Z} \tag{1}$$

$$\hat{P}_1=H^{-1}(H^{-1})^T \tag{2}$$

where $$H=\begin{bmatrix} \ddot{\theta}_1 & \dot{\theta}_1(\Delta T_1)\sin\beta_1 & \dot{\theta}_1(\Delta T_1)\cos\beta_1 \\ \dot{\theta}_1 & (\Delta T_1)\cos\beta_1 & -(\Delta T_1)\sin\beta_1 \\ \sin(\beta_2-\beta_1) & (t_2-t_1)\cos\beta_2 & -(t_2-t_1)\sin\beta_2 \end{bmatrix}$$

$$\underline{Z}=\begin{bmatrix} \dot{\theta}_1(\Delta T_1)(VO_{x1}\sin\beta_1+VO_{y1}\cos\beta_1) \\ (\Delta T_1)(VO_{x1}\cos\beta_1-VO_{y1}\sin\beta_1) \\ (XO_{x2}-XO_{x1})\cos\beta_2-(XO_{y2}-XO_{y1})\sin\beta_2 \end{bmatrix}$$

and $(\ )^T$ indicates the matrix transpose.

As shown in FIG. 3, the initial estimates of the range from the observer station to the target and the target velocity are fed to the prediction unit 24. The prediction unit takes smoothed data from the two most recent measurement legs (corresponding to i and i+1 in combination with the observer station data and initial estimate to compute a predicted estimate of the range from the observer station to the target, target velocity, and the error covariance matrix using the following equations:

$$\tilde{\underline{X}}_{i+1}=A\hat{\underline{X}}_i-\underline{W} \tag{3}$$

$$\tilde{P}_{i+1}=\Phi\hat{P}_i\Phi^T \tag{4}$$

where $$A=\begin{bmatrix} \cos(\beta_{i+1}-\beta_i) & (t_{i+1}-t_i)\sin\beta_{i+1} & (t_{i+1}-t_i)\cos\beta_{i+1} \\ 0 & 1 & 1 \\ 0 & 0 & 0 \end{bmatrix}$$

and $$\underline{W}=\begin{bmatrix} (XO_{x(i+1)}-XO_{xi})\ \sin\beta_{i+1}-(XO_{y(i+1)}-XO_{yi})\ \cos\beta_{i+1} \\ 0 \\ 0 \end{bmatrix}$$

The output of the prediction unit 24 is fed to the correction unit 26. The correction unit 26 takes smoothed data from the two most recent measurement legs (corresponding to i and i+1) in combination with the predicted estimates to compute a corrected estimate of the range from the observer station to the target, target velocity, and the error covariance matrix as follows:

$$\hat{\underline{X}}_{i+1}=\tilde{\underline{X}}_{i+1}+G[\underline{Z}-H\underline{X}_{i+1}] \tag{5}$$

$$\hat{P}_{i+1}=[I-GH^T]\tilde{P}_{i+1} \tag{6}$$

where $$G=\tilde{P}_{i+1}H^T[I+H\tilde{P}_{i+1}H^T]^{-1}$$

$$I=\begin{bmatrix} 1 & 0 & 0 \\ 0 & 1 & 0 \\ 0 & 0 & 1 \end{bmatrix}$$

$$H=\begin{bmatrix} \ddot{\theta}_1 & \dot{\theta}_{i+1}(\Delta T_{i+1})\sin\beta_{i+1} & \dot{\theta}_{i+1}(\Delta T_{i+1})\cos\beta_{i+1} \\ \dot{\theta}_{i+1} & (\Delta T_{i+1})\cos\beta_{i+1} & -(\Delta T_{i+1})\sin\beta_{i+1} \\ \sin(\beta_{i+1}-\beta_i) & (t_{i+1}-t_i)\cos\beta_i & -(t_{i+1}-t_i)\sin\beta_i \end{bmatrix}$$

$$\underline{Z}=\begin{bmatrix} \dot{\theta}_{i+1}(\Delta T_{i+1})(VO_{x(i+1)}\sin\beta_{i+1}+VO_{y(i+1)}\cos\beta_{i+1}) \\ (\Delta T_{i+1})(VO_{x(i+1)}\cos\beta_{i+1}-VO_{y(i+1)}\sin\beta_{i+1}) \\ (XO_{x(i+1)}-XO_{xi})\cos\beta_i-(XO_{y(i+1)}-XO_{yi})\sin\beta_i \end{bmatrix}$$

At this point, the corrected estimation vector $\hat{\underline{X}}_{i+1}$ can be combined with the smoothed bearing $\beta_{i+1}$ to provide an estimate of target position and velocity corresponding to the time $t_{i+1}$.

As data from a new measurement leg becomes available, the index i is increased by one unit and the entire computation process is repeated. In performing the method of the present invention, it is important that the observer station maneuver between measurement legs. One of the inherent features of the method of the present invention is the automatic time updating of the estimate of target position and statistical reduction of estimation error.

It has been found that the utilization of smoothed bearing, bearing rate, and bearing acceleration provides improved range estimates as soon as two measurement legs of data become available. It has also been found that further reduction of estimation error accrues as additional measurement legs become available and the solution is updated. This updating is different from other systems where the solutions of the range to the target are based solely upon the two most recent measurement legs. Still further, the computational procedure involved in the method of the present invention is robust, relatively simple to implement and non-iterative in nature.

It is apparent that there has been provided in accordance with this invention a recursive method for target motion analysis and a system for performing the method which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for estimating the motion of a target relative to an observer station, said method comprising the steps of:

generating data representative of the motion of said target relative to said observer station during first and second measurement legs;

processing said data to yield a smoothed estimate of the bearing rate, bearing and bearing acceleration of said target during each measurement leg;

processing said smoothed estimate of the bearing rate, bearing and bearing acceleration of said target to provide an estimate of the position of the target relative to said observer station and the velocity of said target and to thereby provide an estimate of the motion of said target; and said data processing step comprising sensing the motion of the observer station using at least one navigation sensor; generating a model of the motion of the observer station; and determining an initial estimate of the range from the observer station to the target at a first instance of time and an error covariance matrix using said smoothed estimate of the bearing rate, bearing and bearing acceleration and data representing said model of the motion of said observer station.

2. The method according to claim 1 further comprising:

maneuvering said observation station through at least a third measurement leg;

sensing the position of said target relative to said observer station during each said subsequent measurement leg and generating data representative of the motion of said target relative to said observer station during said subsequent measurement leg;

processing said third measurement leg data to yield a smoothed estimate of the bearing rate, bearing and bearing acceleration of said target for said third measurement leg;

inputting data representative of a model of said target motion into a prediction unit; and inputting said initial estimate of the range from the observer station to the target at a first instance of time and said initial estimate of target velocity, said smoothed estimate of the bearing rate, bearing and bearing acceleration of said target during said third measurement leg, and data from said observer station model into said prediction unit and determining a predicted estimate of the range from the observer station to the target, target velocity, and the error covariance matrix.

3. The method according to claim 2 further comprising:

inputting said predicted estimate of the range from the observer station to the target, target velocity, and the error covariance matrix into a correction unit;

inputting the smoothed data from the second and third measurement legs into said correction unit; and determining a corrected estimate of the range from the observer station to the target, target velocity, and the error covariance matrix using said inputted predicted estimate and said inputted smoothed data.

4. The method according to claim 3 further comprising combining the corrected estimate of the range from the observer station to the target with the smoothed bearing at the third measurement leg to provide said estimate of target position and velocity for the time at the midpoint of the third measurement leg.

5. The method of claim 4 further comprising inputting said estimate of target position and velocity into said model of said target motion.

6. The method of claim 5 further comprising:

maneuvering said observer platform through subsequent measurement legs; and repeating the steps of the method to yield a further estimate of target position and velocity.

7. A system for estimating the motion of a target relative to an observer station, said system comprising:

means for generating data representative of the motion of the target relative to the observer station during first and second measurement legs;

first means for processing said data to yield a smoothed estimate of the bearing, bearing rate, and bearing acceleration of the target during each measurement leg;

second means for processing the smoothed estimate of the bearing, bearing rate, and bearing acceleration of said target to provide an estimate of the position of the target relative to the observer station and the velocity of said target and to thereby provide an estimate of the motion of said target;

means for sensing the motion of said observer station;

means for creating a model of the motion of the observer station using data sensed by said sensing means;

means for creating a model of the motion of the target;

the second means comprising means for determining an initial estimate of the range from the observer station to the target, an initial estimate of target velocity, and an initial error covariance matrix using the output of said first means and data from said observer station motion model creating means; and the second means further comprising means for determining a predicted estimate of the range from the observer station to the target, a predicted estimate of target velocity, and a predicted error covariance matrix using the output of said first means, the output of said means for determining an initial estimate, data from said observer station motion model creating means, and data from said target motion model creating means.

8. The system according to claim 7 wherein said second means further comprises means for determining a corrected estimate of the range from the observer station to the target, a corrected estimate of target velocity, and a corrected error covariance matrix using the output from said means for determining a predicted estimate of the range from the observer station to the target, a predicted estimate of target velocity, and a predicted error covariance matrix.

9. The system according to claim 8 wherein said means for determining a corrected estimate of the range from the observer station to the target, the corrected estimate of target velocity, and the corrected error covariance matrix outputs a signal representing an estimate of the target position and the target velocity.

* * * * *